H. P. TOWNSEND.
MACHINE FOR MAKING SCREWS.
APPLICATION FILED JUNE 27, 1914.
1,257,551. Patented Feb. 26, 1918.
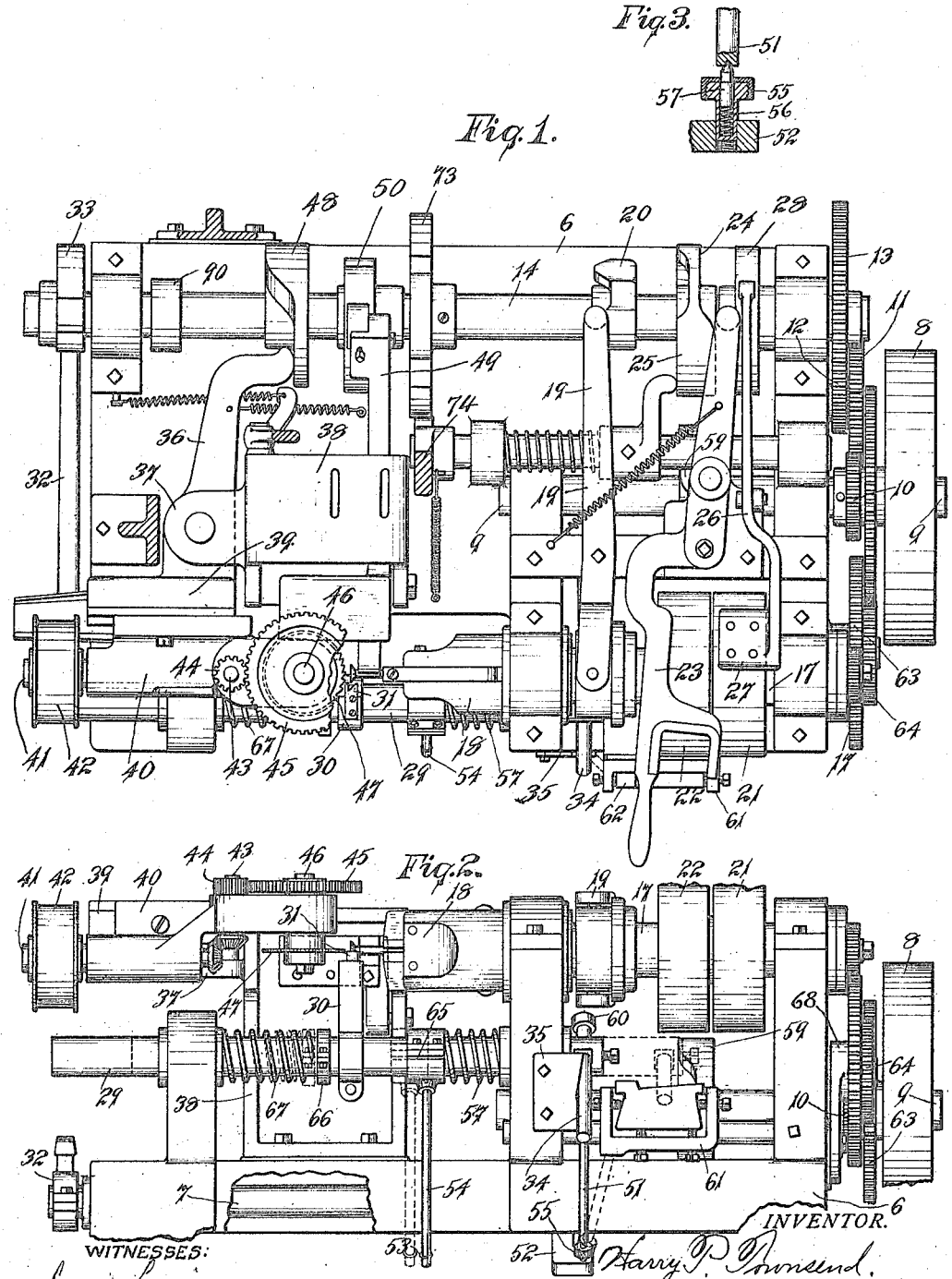

UNITED STATES PATENT OFFICE.

HARRY P. TOWNSEND, OF HARTFORD, CONNECTICUT, ASSIGNOR TO THE H. P. TOWNSEND MANUFACTURING COMPANY, OF HARTFORD, CONNECTICUT, A CORPORATION OF CONNECTICUT.

MACHINE FOR MAKING SCREWS.

1,257,551.  Specification of Letters Patent.  Patented Feb. 26, 1918.

Application filed June 27, 1914. Serial No. 847,772.

*To all whom it may concern:*

Be it known that I, HARRY P. TOWNSEND, a citizen of the United States, residing at Hartford, in the county of Hartford and State of Connecticut, have invented a new and Improved Machine for Making Screws, of which the following is a specification.

My invention, while it relates more especially to the class of machines above named, possesses advantages peculiar to machines for making other articles, and it is therefore not confined to a screw machine. An object of my invention, among others, is to provide a machine of this class that may be adapted, to a wide extent, to different classes of work, by simple changes in minor parts of its mechanism, and a further object is to produce a machine of the character described that shall be extremely rapid and accurate in its operation.

One form of machine embodying my invention, and in the construction and use of which the objects herein set out, as well as others, may be attained, is illustrated in the accompanying drawings, in which—

Figure 1 is a plan view of that part of a machine embodying my invention, with parts broken away.

Fig. 2 is a view in front elevation of a part of the machine, with parts broken away to show construction.

Fig. 3 is a detail view, scale enlarged, showing the construction of the rock arm step.

Prior to my invention it has been customary, in the making of small metallic articles, more especially screws and the like, to use a machine capable of performing only a very few of the operations of slotting, shaving, pointing, threading, boring, tapping, milling, turning and the like, so that in cases where many or all of such operations are required many machines have been employed for the purpose. My improved machine, forming the subject matter of this application, embodies means whereby all of the operations, above mentioned, as well as others, may be performed with a single machine, simply by the change of a very few of the minor parts.

My improved machine embodies novel means for feeding blanks to the work holding spindle, these feeding devices constituting a separate invention set out in a copending application filed by me concurrently herewith and which embodies the cam 73 and feed finger lever 74 shown in Fig. 1, the invention of the present case being confined to that part of the machine independent of the feeding devices, except as to certain parts which have functions in connection with the structures containing both inventions. In order to show the connection between the two devices, certain parts peculiar to the feeding mechanism are shown herein but are not particularly described.

In the accompanying drawings, the numeral 6 denotes a table, supported in any suitable manner, and having a driving shaft 9 with a pulley 8 secured thereto and connected by gears and pinions 10, 11, 12, and 13 to drive a cam shaft 14.

A chuck spindle 17 is suitably mounted in bearings on the frame and has a chuck 18 operated by means of a chucking lever 19 actuated by a cam 20 on the cam shaft 14, said spindle also having fast and loose pulleys 21—22 operating in connection with a belt shifter 23 actuated as by means of the shifter cam face 24 of a cam 25 secured to the cam shaft 14. A brake lever 26, bearing a brake 27, is mounted on the frame and is actuated by a cam 28 to apply a brake to the fast pulley 21.

A tool bar 29 is arranged for longitudinal movement in the frame, and carries a tool post 30 rising therefrom and supporting a tool 31 to act upon an article held in the chuck 18. This bar may be rocked in any suitable manner, one means herein shown embodying a tool bar operating lever 32 secured to a rock shaft 7 located substantially under and in line with the tool bar extending in position to be operated upon by a rock shaft operating cam 33 on the shaft 14. A tool bar operating arm 34, secured to the tool bar, projects outwardly therefrom and rests against a tool bar operating cam 35 having a cam face to receive said arm to move the bar longitudinally as it is rocked in one direction, the bar being rocked in the opposite direction by a spring 53 or like part secured at one end to a spring rod 54 and its other end to a fixed part of the machine. A rod 51 connects the arm 34 with a rock arm 52 secured to the rock shaft 7.

The ends of the rod 51 yieldingly and loosely engage the arm 54 and step 55 in the rock arm 52 by means of the end of one part being seated in a recess in the other part, said step being adjustably mounted as by being screw threaded into the arm 52. In the preferred form of construction shown herein the rod 51 rests upon a post 57 seated upon a step spring 56, as shown in detail in Fig. 3 of the drawings.

The cam 35 is preferably a plate removably secured to the frame of the machine, the cam being located on one side of the plate and with one end inclined, forming an active face, the remainder of the edge being straight. By using the cam as shown in the drawings longitudinal movement of the tool bar will be obtained by reason of its rocking movement, and by reversing the cam end for end, the tool bar may be rocked without imparting longitudinal movement thereto. By employing cams with working faces inclined at different angles the extent or amount of longitudinal movement of the bar 29 as compared with the lateral movement of the tool may be regulated to any degree. The use of the cam would be required in connection with the form of shaving tool shown in Fig. 1, or with a pointing tool, both of which are held by the tool post 30, these tools requiring a movement diagonally with respect to the axis of the spindle so that, as in the case of the shaving tool, the flat surface of the head and the beveled under surface thereof may be simultaneously cut by the same tool. A spring 57 upon the tool bar may be employed to move the bar longitudinally and return it to its normal position from which it may have been moved by the cam plate 35. By means of the arrangement thus far described, the machine is adapted for use as a pointer or shaver only, or as a combined shaver and slotter.

Another means for operating the bar 29 embodies a threading cam 59 secured to the driving shaft 9 and positioned to act, when required, upon the tool bar, the connection between these parts being of any suitable form. As shown a threading arm 60 projects from the tool bar laterally thereof and has a roller adapted to rest against the cam 59. A former rest 61 is pivotally mounted in the frame and has a former 62 in the shape of a plate adjustably mounted thereon. The arm 34 from the tool bar rests in engagement with this former, the arm 60 being in fact an extension of the arm 34. When used as a threader the tool bar operating rod 51 will be engaged in a socket underneath the former rest, being, of course, of proper length to serve its purpose. It will be readily understood that when the machine is used as a threader the tool bar operating cam 35 will not be employed, the bar 29 being moved lengthwise to properly position the arm 34 over the former 62. In doing this a collar 65 bearing the spring rod 54 may be located in a different position to loosen the spring that thus becomes inactive, and a collar 66 will be clamped against the spring 67 to tension it and cause it to move the bar in one direction against the action of the threading cam 59. The tool bar 29 will, of course, be properly positioned in its bearings, and when the arm 34 rests upon the former 62 the roll on the arm 60 will be in proper position for action by the cam 59.

When used as a threader, as above described, the shaft 9 and cam shaft 14 will be driven from a single source, as from the spindle 17, the belt to the pulley 8 being omitted, and a train of gears 63 being employed for this driving purpose. In this case the pinion on the spindle 17 meshes with a gear secured to rotate with the pinion 64 that meshes with a change gear secured to the shaft 9. The gear 64 is mounted on a movable support 68, so that it may be engaged with or disengaged from its mating gear to complete or break the connection between the spindle and the main driving shaft 9.

A saw supporting lever 36 is mounted between ears 37 projecting from a bracket 38 rising from the table 6. This lever has a head 39 to which a saw support 40 is adjustably secured, as by means of tongued and grooved parts and screws, the latter holding the support firmly in place on the head. A saw actuating shaft 41 is mounted in the support and is driven as by means of a belt passing around a pulley 42 secured to the shaft. A bevel gear on the opposite end of the shaft 41 from said pulley meshes with a bevel gear on a connecting shaft 43 mounted in the support, the opposite end of the shaft 43 from the bevel gear having a pinion 44 meshing with a gear 45 secured to a saw shaft 46 mounted in the support and having a slotting saw 47 located opposite the chuck 18. The lever 36 is operated as by means of a saw operating cam 48 secured to the cam shaft 14.

A back rest lever 49 is mounted on the frame to be actuated by a back rest cam 50 on the shaft 14, the opposite end of the lever being formed to support screws or other articles, as plainly shown in Fig. 1 of the drawings.

The screw is acted upon by the tool 31 and the saw 47, the latter being moved toward the article by means of the saw supporting lever 36. When the operation of the tool 31 has been completed the belt is automatically shifted from the fast pulley 21 to the loose pulley 22, and the cam 28 actuates the brake 27 to quickly stop the rotation of the spindle, when the saw is caused to operate by means of the lever 36 and cam 48. When this operation is completed the belt is automatically shifted to the fast pulley and the brake is released and the chuck jaws of the chuck are operated by the chucking lever 19 to open the jaws at the proper time for ejection of the article.

It will be noted that the machine herein described may readily be arranged to perform the single operations of slotting, shaving, pointing, or threading, and the combined operations of shaving and slotting, or of threading and pointing, and that the machine may be readily adapted for performing other operations. In the operation of slotting, the spindle will be held stationary and only the cam 48 of the cam shaft will be utilized in connection with the chucking cam 20, the feed finger cam 73 and one face of the cam 24 and the back rest cam 50.

In the operation of shaving the tool illustrated in Fig. 1 may be employed, the spindle will be driven constantly without requirement for belt shifting, the chucking mechanism will be employed and the cam 33, rock shaft or tool bar 29 and cam plate 35 will be used.

In the operation of pointing, the pointing tool may be mounted upon the head 39, in which event the mechanism above mentioned with respect to the slotting operation will be employed, and in addition thereto the spindle will be rotated, but the belt shifting and brake mechanism will not be utilized. It will be understood that the chuck mechanism will always be used.

In the operation of threading the saw mechanism will remain idle as will the belt shifting and brake mechanism, the shaft 9 and cam shaft 14 being driven directly from the spindle 17. The cam 33 and rock shaft 7 will be used to rock the threading tool into the cuts as required, the cam plate 35 being removed as above described.

For the combined operation of slotting and shaving the parts will be arranged and employed as illustrated in Fig. 1, the threading mechanism above described being idle, and it will be understood that the connection between the spindle 17 and cam shaft 14 is only necessary during the threading operations although it may be made use of at other times if desired.

In the operation of threading and pointing the threading mechanism above described will be employed and the pointing tool will be mounted on the head 39.

While I have illustrated herein one construction of mechanism embodying my invention, this may be changed to a greater or lesser degree without departing from the spirit and intent of the invention which is, therefore, not limited to a mechanism constructed in exact accordance with that illustrated and described herein.

I claim—

1. A machine for forming articles from metal including a cam shaft, belt actuating means for driving said shaft, a chucking spindle, means for driving said spindle independently of the cam shaft, means for operating upon an article held by a chuck on said spindle, connections between said spindle mechanism and the cam shaft to control operation of the spindle, a saw, means independent of said cam shaft for driving said saw, and connections between said saw mechanism and the cam shaft.

2. A machine for forming articles from metal including a cam shaft with belt driven mechanism for operating it, a chuck spindle, means for driving said spindle independently of the cam shaft, means for operating upon an article held by a chuck on said spindle, means connected with the cam shaft to control operation of the chuck spindle, means connected with the cam shaft for controlling the rotation of the chuck spindle, a saw, means independent of said cam shaft for rotating the saw, and means connected with said cam shaft for feeding the saw.

3. A machine for forming articles from metal including a cam shaft, belt actuating means for driving said shaft, a chucking device, means for actuating said chucking device independently of the cam shaft, means for operating upon an article held by said chucking device, a saw, means independent of said cam shaft for driving said saw, and connections between said saw mechanism and the cam shaft.

4. A machine for forming articles from metal including a cam shaft with belt driven means for operating it, a chuck spindle having means independent of the cam shaft for rotating said spindle, means for operating upon an article held by a chuck on said spindle, spindle operating means connected with the cam shaft, a brake connected with said cam shaft to stop rotation of the spindle, and means for operating feeding mechanism for supplying articles to said spindle.

5. A machine for forming articles from metal including a cam shaft with belt driven means for operating it, a chuck spindle having means independent of the cam shaft for rotating said spindle, means for operating upon an article held by a chuck on said spindle, spindle operating means connected with the cam shaft, a saw for slotting an article held by said chuck, and a brake connected with said cam shaft to stop rotation of the spindle for operation of said saw.

6. A machine for forming articles from metal including a cam shaft with belt driven means for operating it, a chuck spindle having means independent of the cam shaft for operating said spindle, means for operating upon an article held by a chuck on said spindle, means connected with the cam shaft for controlling operation of the spindle, and a brake connected with the cam shaft and operated by cams thereon independently of said controlling means to stop rotation of the spindle.

7. In a machine for forming articles from metal, a chuck spindle, belt operated means for driving said spindle, a belt shifter lever for controlling the belt on said spindle, a cam for operating said lever, and a handle on said lever as a means for manually operating said lever.

8. In a machine for forming articles from metal, a cam shaft with means for operating it, a chuck spindle having fast and loose pulleys, a brake lever connected with a cam on said cam shaft and having a brake adapted to be pressed against the face of the tight pulley, a belt shifter for controlling the belt on said pulleys, said shifter being connected with the cam on the cam shaft, and a handle on the shifter as a means for manually operating it.

9. In a machine for forming articles from metal, a chuck spindle, belt operated means for driving said spindle, a belt shifter lever for controlling the belt on said spindle, means for operating said lever, a fork at the end of the lever to receive said belt, one of the branches of the fork being extended and formed into a handle for manual operation of said lever.

10. In a machine for forming articles from metal, a chuck spindle with means for operating it, supports rising from the bed of the machine, a tool bar supporting a tool to operate upon an article held by the chuck, said bar being rotatably mounted in said supports, means for rocking the tool bar, and a cam secured to the side of one of said supports and located to engage a projection from the tool bar to cause longitudinal movement thereof by reason of its rocking movement.

11. In a machine for forming articles from metal, a chuck with means for operating it, a tool bar supporting a tool to operate upon articles held by the chuck, means for rocking the tool bar, and a cam having a working and a non-working face, the former being arranged at such an angle as will cause longitudinal movement of the bar to the required extent by reason of its rocking movement.

12. In a machine for forming articles from metal, a chuck with means for operating it, a tool bar supporting a tool to operate upon articles held by the chuck, means for rocking the tool bar, and a reversible cam having a working face arranged at such angle as will cause longitudinal movement of the bar by reason of its rocking movement, and without change of the cam, a face to cause no longitudinal movement by reason of the rocking movement of said bar.

13. In a machine for forming articles from metal, a chuck spindle with means for operating it, a tool bar supporting a tool to operate upon an article held by the chuck, means for rocking the tool bar, and a reversible cam having a working and non-working face located at angles to each other and in one position to cause longitudinal movement of said bar and in its other position to impart no movement to said bar.

14. In a machine for forming articles from metal, a chuck with means for operating it, a tool bar supporting a tool to operate upon articles held by the chuck, an arm secured to the tool bar, a rock shaft with means for operating it, an arm extending from said rock shaft, a rod loosely resting in sockets in said arms, and means for forcing said arms in opposite directions toward each other.

15. In a machine for forming articles from metal, in combination with a tool bar, an arm projecting therefrom, a rock shaft with means for operating it, an arm projecting from the rock shaft, a step adjustably mounted in said arm, a rod resting loosely in sockets in said step and arm projecting from the tool bar, and means for pressing said arms in opposite directions normally toward each other.

16. In a machine for forming articles from metal, in combination with a tool bar, an arm projecting therefrom, a rock shaft with means for operating it, an arm projecting from said rock shaft, a spring located in a socket supported by said arm, a rod loosely resting upon said spring at one end and with its opposite end loosely resting in a socket in the tool bar arm, and means for normally pressing said arms toward each other.

17. In a machine for forming articles from metal, a chuck with means for operating it, a tool bar supporting a tool to operate upon articles held by the chuck and having longitudinal and rotary movement, a cam plate for imparting one of said movements to said bar, an arm projecting from the tool bar in contact with said cam plate, a rock shaft with means for operating it, and means connected with said bar for imparting the other movement thereto.

18. In a machine for forming metallic articles, a frame, a chuck mounted in the frame, a tool bar mounted for longitudinal and rotary movement in the frame, a rock shaft, an arm projecting from the tool bar, means upon the frame for removable attachment of a cam plate thereto to operate upon the arm from the tool bar, a threading cam shaft mounted in the frame and having a threading cam arranged to operate upon the tool bar, a former base pivotally mounted on the frame to operate upon an arm projecting from the tool bar, means for locating the former base in an inoperative position, an arm projecting from the rock shaft, and means for connecting said arm with the former base or with the arm projecting from the tool bar.

19. In a machine for forming metallic articles, a frame, a chuck mounted in the frame, a tool bar, means for positioning said tool bar in different positions, said bar having longitudinal and rotary movement in the frame in either of said positions, a rock shaft, an arm projecting from the tool bar, means for operating the tool bar in either of said positions, an arm projecting from said rock shaft, and means for connecting the arms projecting from the tool bar and rock shaft for operation of the bar in either of its working positions.

20. In a machine for forming metallic articles, a frame, a chuck mounted in the frame, a tool bar mounted for longitudinal and rotary movement in the frame, a rock shaft, an arm projecting through the tool bar for operation by different devices at the opposite ends of said arm, separate mechanisms for independently operating upon said arm, an arm projecting from said rock shaft, and means for connecting the arms from the rock shaft and tool bar for operation of the latter.

21. In a machine for forming metallic articles, a frame, a chuck mounted in the frame, a tool bar mounted for longitudinal and rotary movement in the frame, a rock shaft, an arm projecting through the tool bar and movable longitudinally therein, means for securing the arm to the tool bar, mechanism for operating upon each end of said arm to impart movement to the tool bar, an arm projecting from said rock shaft and means for connecting the arm projecting from the tool bar and that projecting from the rock shaft for operation of said tool bar.

HARRY P. TOWNSEND.

Witnesses:
ARTHUR B. JENKINS,
A. E. O'BRIEN.

Copies of this patent may be obtained for five cents each, by addressing the "Commissioner of Patents, Washington, D. C."